Jan. 10, 1967 H. J. McDERMOTT 3,297,222
STRAND CONVEYOR PROVIDED WITH FLUENT DRIVE MEANS
Filed Feb. 12, 1965

United States Patent Office 3,297,222
Patented Jan. 10, 1967

3,297,222
STRAND CONVEYOR PROVIDED WITH
FLUENT DRIVE MEANS
Henry J. McDermott, Collingdale, Pa., assignor to FMC Corporation, Philadelphia, Pa., a corporation of Delaware
Filed Feb. 12, 1965, Ser. No. 432,227
5 Claims. (Cl. 226—97)

This invention relates to apparatus for conveying strands and particularly strands which are of heavy or stiff character, as for example monofilaments formed of polypropylene. The term "strands" as employed herein includes continuous filaments, yarns, threads, tows, tapes, monofilaments, etc.

The apparatus of the present invention is suited for use with, and particularly in lacing, equipment which is designed for use with endless lengths of continuous filamentary material. In such lace-up operations, the starting end of a strand is led over and about various structures, such as rolls, guides, etc., which are located at different processing stages. During such lace-up, it is often necessary to collect as waste a portion of the strand which has been led through certain of the processing stages until such time as the operator can complete the lace-up operation by leading the strand through the remaining stages of the operation.

Conventional strand conveying devices are generally unsatisfactory for use with heavy or stiff strands, such as monofilaments formed of polypropylene. With such strands it is extremely difficult to lace the leading end thereof through conventional strand conveying apparatus and in advancing such strand once this initial lacing has been completed. Accordingly, a primary object of this invention is to provide a generally new or improved and more satisfactory lacing apparatus.

Another object is the provision of strand conveying apparatus which facilitates uniform and rapid advancement of heavy or stiff strands therethrough.

Still another object is to provide an improved apparatus which is adapted for rapidly lacing a continuously advancing strand through strand handling equipment.

A further object is to provide a strand conveying apparatus which is simple in construction, economical to operate and safe in use.

Still further objects will appear from the following description.

These objects are accomplished in accordance with the present invention by an apparatus which includes an aspirator having a passage into which gas under pressure is delivered. This gas is introduced between strand inlet and outlet openings of the passage and is directed toward the strand outlet opening. As a result, suction is created at the inlet opening of the passage and serves to pull in the leading end portion of a strand which has been placed across such opening. Preferably, the strand passage is of elongated and narrow cross-section so that strands which are heavy or stiff in character can be easily pulled into the inlet opening by the suction created thereat. Upon leaving the outlet opening the strand is gripped between a pair of driven rotatable strand advancing units which cooperate with the aspirator for conveying the strand at a generally uniform and rapid rate of speed.

For a greater understanding of this invention, reference is made to the following detailed description and drawing in which FIGURE 1 is a side view of the apparatus of the present invention with a portion thereof being removed to show the interior construction;

Figure 1:
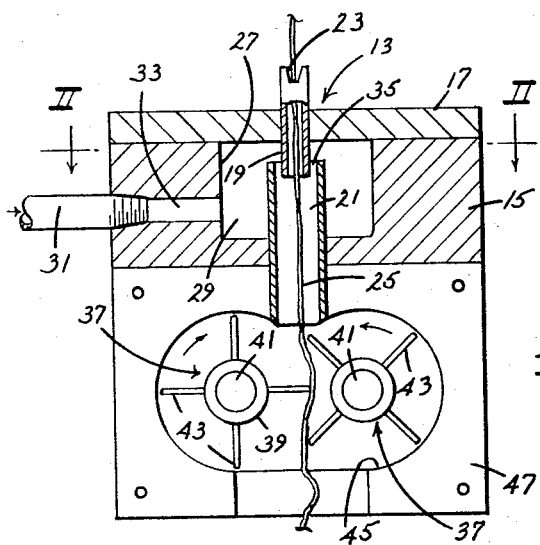

With reference to the drawing, the apparatus of the present invention includes an aspirator 13 having an aspirator block 15, cover plate 17 and flattened telescoped tubing members 19 and 21 which together provide a generally enclosed passage. The tubing member 19 extends up through the cover plate 17 and provides an inlet opening into the aspirator 13. Similarly, the tubular member 21 extends through the aspirator block 15 and provides an outlet opening. A slot 23 extends across the inlet opening of the tubing member 19 and permits a strand, such as shown at 25, to be held in desired position after it has been laid across the inlet opening during initial lacing operations.

The aspirator block 15 is hollowed out as shown at 27 and cooperates with the cover plate 17 to form a chamber 29 into which is delivered a gas under pressure, such as compressed air, through a pipe 31 and passage 33. From the chamber 29 the compressed gas flows through a narrow space 35 which exists between the ends of the telescoped tubing members 19 and 21 and is directed toward the outlet end of the aspirator. This movement of the compressed gas of course creates a suction at the inlet opening of the aspirator which serves to pull or draw in a strand which has been laid in the slot 23.

Figure 2:
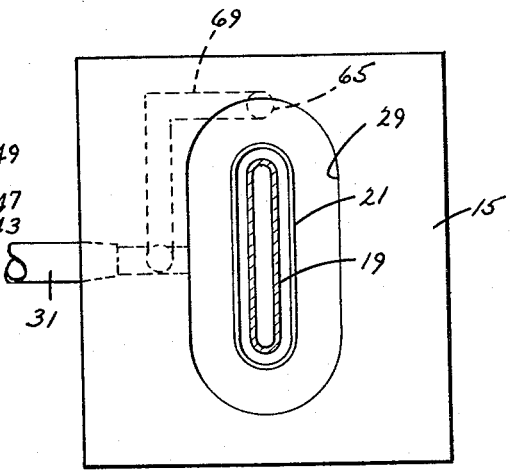
FIGURE 2 is a horizontal section taken substantially along the line II—II of FIGURE 1.

Of particular significance, and as shown in FIGURE 2, is that the flat tubing members 19 and 21 present cross sections which are elongated in the direction of one axis but are relatively narrow in the direction of its other axis. The elongated character of the inlet opening permits relatively heavy or stiff strands to be drawn into the aspirator after such strand has been merely laid across the inlet end thereof, and eliminates the difficult and almost impossible task of trying to insert the leading end of a continuously moving strand into the aspirator.

In many applications the suction effect provided by the aspirator would be sufficient to convey the strand 25 once lacing has been completed. With a relatively heavy or stiff strand, however, additional means must be provided to insure that the strand advancement is continuous and at a uniform rate of speed.

In the apparatus of the present invention, a pair of strand advancing units 37 are provided, each of which includes a central hub 39 which is fixed to a shaft 41 and a plurality of radially projecting blades 43. The cooperating strand advancing units 37 are located within a chamber 45 formed in a block 47, while the shafts 41 are rotatably supported and project through bearing plates 49 which are positioned on opposite sides of the block 47. The shafts 41 are each provided at one end with a fluid driven wheel 51 and at their opposite end with meshing gears 53. The cooperating fluid driven wheels 51 and meshing gears 53 are located within similar chambers 55 and 57 formed in side plates 59 and 61 which are fixed to the block 47 by screws 63. A nozzle 65 is provided for directing a fluid, such as compressed air, against vanes 67 of the air wheels 51 and is preferably supplied from the passage 33 by a connecting channel 69. Openings 71 are provided in the side plate 59 for venting the spent fluid from the chamber 55.

In use, compressed air is delivered into the chamber 29 through pipe 31 and passage 33 and flows through the space 35 and into the tubing member 21. The movement of this compressed air through the space 35 and tubing member 21 exerts a vacuum within the tubing member 19 so that a strand 25 which is merely laid across the open end thereof, as within the slot 23, is rapidly sucked inwardly. As heretofore mentioned, the tubing members 19 and 21 are both elongated in cross-section so that strands which are relatively heavy or stiff, such as a monofilament formed of polypropylene, need to be flexed to only a small degree, and perhaps at most into a generally U-shaped position during the lacing stage. Preferably, and as illustrated, the tubing members are each of uniform cross-section to insure easy and rapid strand lacing, yet minimize any sacrifice in the suction effect created within the aspirator.

As the strand 25 issues from the tubing member 19, it is gripped by the blades 43 of rotating units 37 which, together with the compressed gas issuing from the tubing member 19, serve to continue the uniform and rapid strand advancement. The strand advancing units 37 are rotated by directing a portion of the compressed air from the passage 33, into the channel 69 and nozzle 65, and then impinging the same against the vanes 67 of the wheels 51. This movement of the wheels 51 of course rotates the units 37 which are kept in desired synchronism by the intermeshing of gears 53.

Figure 3:
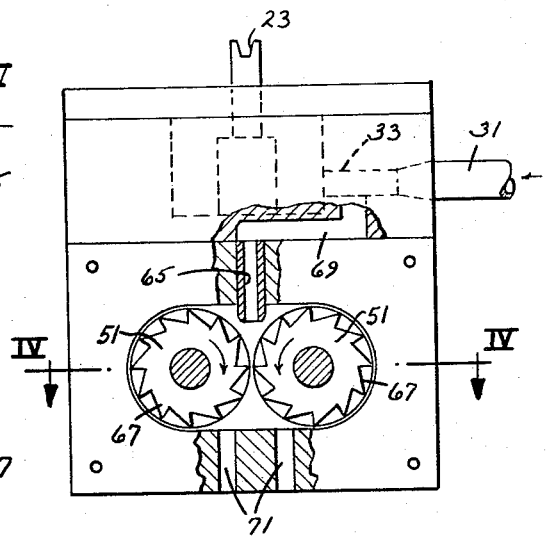
FIGURE 3 is a view illustrating the opposite side of the apparatus shown in FIGURE 1, with a portion thereof being removed to show the interior construction.
Figure 4:
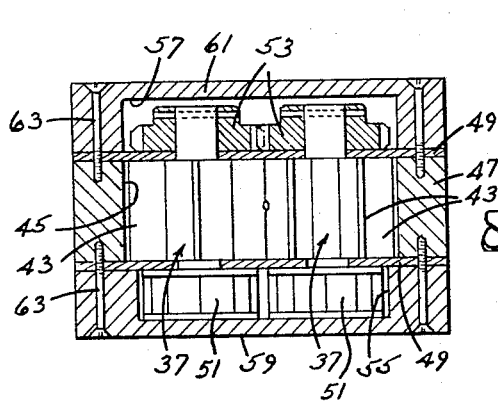
FIGURE 4 is a transverse section taken along the line IV—IV of FIGURE 3.

Once the air serves its intended function of rotating the wheels 51 it is vented into the ambient atmosphere through the openings 71. From FIGURE 3, it will be noted that these openings 71 are spaced laterally relative to the path assumed by the compressed gas leaving the nozzle 65. With this arrangement the compressed gas must travel an arcuate path as it issues from the nozzle 65 and travels toward the openings 71, during which time it exerts a continuous driving force on the vanes of the wheels 51.

It is to be understood that changes and variations may be made without departing from the spirit and scope of the invention as defined in the appended claims.

I claim:

1. Apparatus for conveying a continuous strand including means providing a generally enclosed passage having strand inlet and outlet openings, a conduit for delivering a stream of gas under pressure and introducing a portion thereof into said passage between said openings and in a direction extending toward said outlet opening to thereby induce a suction at said inlet opening, a pair of rotatable strand advancing units positioned to receive a strand therebetween as it issues from said outlet opening, a pair of wheels located within a chamber and fixed to rotate with the respective strand advancing units, vanes projecting from said wheels, a nozzle for directing the remainder of the stream of gas which is delivered through said conduit into said chamber along a path extending between said wheels and against the vanes thereof to thereby drive said strand advancing units, and means for venting the spent gas from said chamber.

2. Apparatus as defined in claim 1 wherein said venting means includes a pair of openings, each being positioned on opposite sides of the path of the gas issuing from said nozzle.

3. Apparatus as defined in claim 1 wherein said strand advancing units each include blades projecting radially from a central hub, the blades of the two members together cooperating to grip and advance a strand as they are driven by said wheels.

4. Apparatus as defined in claim 1 wherein said inlet and outlet openings are elongated and narrow in cross-section.

5. Apparatus as defined in claim 1 further including a gear fixed to each of said strand advancing units, said gears being in meshing engagement with each other so that said units rotate in unison when said wheels are driven.

References Cited by the Examiner
UNITED STATES PATENTS

| | | | |
|---|---|---|---|
| 1,992,989 | 3/1935 | Burns | 226—97 |
| 2,447,982 | 8/1948 | Koster | 226—97 |
| 3,010,632 | 11/1961 | Brantigam | 222—188 X |
| 3,163,324 | 12/1964 | Lupo | 221—278 X |

ROBERT B. REEVES, *Primary Examiner.*

WALTER SOBIN, *Examiner.*